(12) United States Patent
Rostkowski et al.

(10) Patent No.: US 6,257,054 B1
(45) Date of Patent: Jul. 10, 2001

(54) PORTABLE ROLLER DYNAMOMETER AND VEHICLE TESTING METHOD

(75) Inventors: Jacek L. Rostkowski, Nepean; William Desmond McGonegal, Osgoode; Frederick J. Hendren; Roman Gorny, both of Nepean, all of (CA)

(73) Assignee: Her Majesty the Queen in right of Canada, as represented by the Minister of Natural Resources (CA)

( * ) Notice: Subject to any disclaimer, the term of this patent is extended or adjusted under 35 U.S.C. 154(b) by 0 days.

(21) Appl. No.: 09/488,704

(22) Filed: Jan. 21, 2000

Related U.S. Application Data

(63) Continuation-in-part of application No. 09/081,816, filed on May 20, 1998, now abandoned.
(60) Provisional application No. 60/047,353, filed on May 21, 1997.

(51) Int. Cl.[7] .................................................. G01M 15/00
(52) U.S. Cl. ........................ 73/117; 73/123; 73/862.191
(58) Field of Search .............................. 73/117, 123, 862, 73/862.08, 862.191, 862.29, 862.321

(56) References Cited

U.S. PATENT DOCUMENTS

| | | | |
|---|---|---|---|
| 3,277,703 | * 10/1966 | Cline ........................................ | 73/123 |
| 3,554,023 | * 1/1971 | Geul ........................................ | 73/117 |
| 4,450,728 | * 5/1984 | D'Angelo et al. ................. | 73/862.28 |
| 4,468,955 | * 9/1984 | Yamasaki et al. ..................... | 73/117 |
| 4,688,419 | * 8/1987 | D'Angelo et al. .................... | 73/117 |
| 4,870,585 | * 9/1989 | Manzolini ............................... | 73/117 |
| 5,010,763 | * 4/1991 | Schneider ............................... | 73/117 |
| 5,154,076 | * 10/1992 | Wilson et al. ......................... | 73/117 |
| 5,193,386 | * 3/1993 | Hesse et al. .......................... | 73/117 |
| 5,375,461 | * 12/1994 | Suzuki ................................... | 73/117 |
| 5,392,640 | * 2/1995 | Fukuda et al. ........................ | 73/117 |
| 5,402,676 | * 4/1995 | Shibayama et al. .................. | 73/117 |
| 5,429,004 | * 7/1995 | Cruickshank .................... | 73/862.29 |
| 5,445,013 | * 8/1995 | Clayton, Jr. et al. . | |
| 5,450,748 | * 9/1995 | Evans ................................... | 73/117 |

FOREIGN PATENT DOCUMENTS

| | | | |
|---|---|---|---|
| 0 246 345 | * 11/1987 | (EP) . | |
| 0 522 198 A1 | * 1/1993 | (EP) . | |
| WOX97/ 32189 | * 9/1997 | (WO) . | |

* cited by examiner

Primary Examiner—Eric S. McCall
(74) Attorney, Agent, or Firm—McFadden, Fincham

(57) ABSTRACT

A roller dynamometer is provided, having at least one supporting carriage having a rotatable roller and a dynamometer linked to the roller for measuring torque output of a vehicle. The carriages are rollable on a substrate for positioning under a vehicle. In one aspect, multiple dynamometer and roller units are provided, for engagement with multiple vehicle wheels, with the units being linked electronically for common control by a control unit that simulates either straight line or curved driving conditions. In a further aspect, the dynamometer is supported on the carriage by a rotary mount. In a further aspect, the rollers have a generally hourglass shape to permit vehicle wheel self-centering.

7 Claims, 5 Drawing Sheets

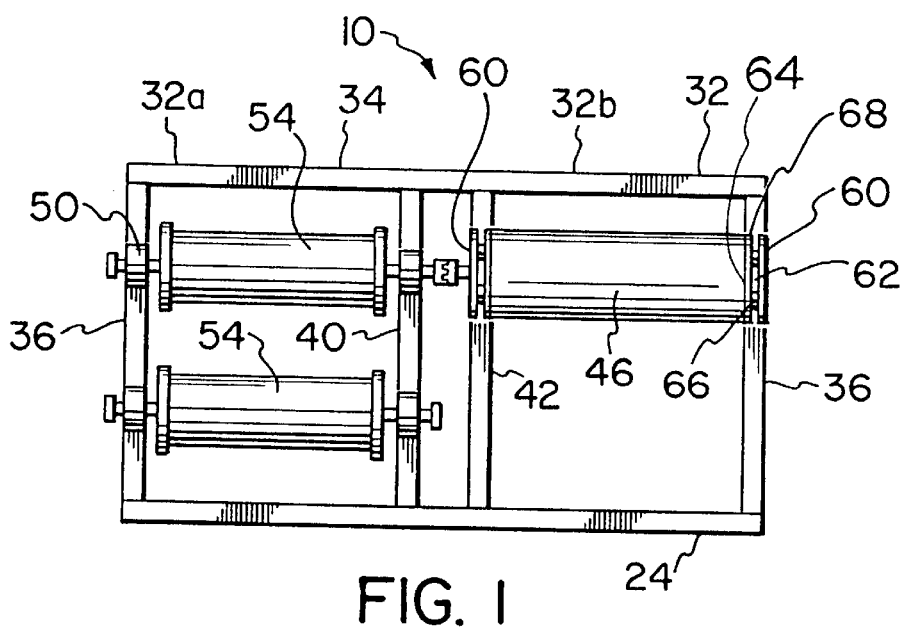
FIG. 1
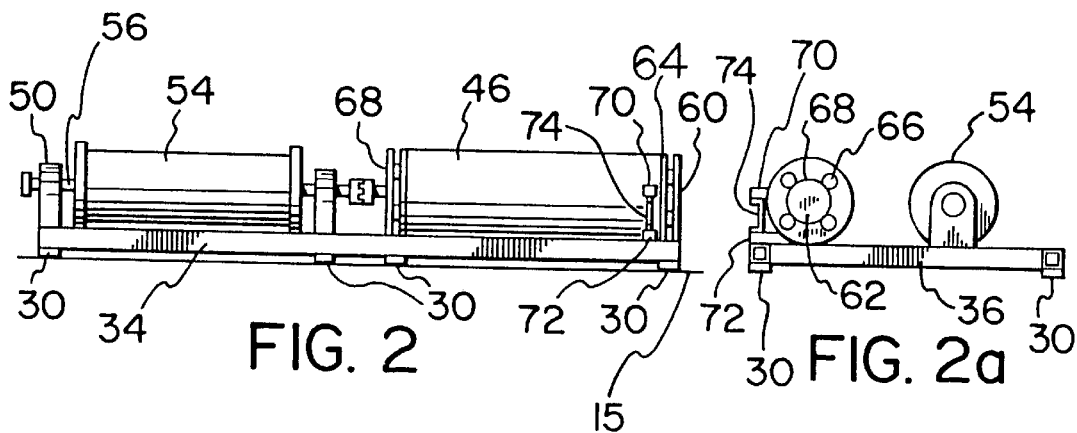
FIG. 2
FIG. 2a

PORTABLE ROLLER DYNAMOMETER AND VEHICLE TESTING METHOD

RELATED APPLICATION

This is a continuation-in-part of application Ser. No. 09/081,816 filed on May 20, 1998 now ABN. which claims benefit of Provisional Appln No. 60/047,353 filed May 21, 1997.

FIELD OF THE INVENTION

The invention relates to a chassis dynamometer and test method for simulating road conditions, for testing a vehicle having at least two drive wheels, and more particularly to a dynamometer having rollers for engagement with the vehicle wheels, and that is relatively compact, inexpensive and portable. Further, the invention relates to an apparatus and method permitting simulation of straight-line and curved driving conditions. In another aspect of the invention relates to a chassis dynamometer arrangement for testing of brake, differential and transmission assemblies.

BACKGROUND OF THE INVENTION

Emissions testing and maintenance of vehicles is effective if vehicle road conditions may be effectively simulated. This is typically accomplished by means of a roller arrangement for contact with drive wheels of the vehicle, with the rollers being operatively linked to a dynamometer for placing a controlled load on the rollers. The load quantum will be a function of the rotational speed of the rollers (i.e. the simulated vehicle speed), simulated and real friction losses, and a polynomial equation representing wind resistance of the particular vehicle. The dynamometer simulates two aspects of vehicle performance namely inertia and drag. Inertia in this case is governed by the weight of the vehicle and the equivalent of rotating masses of the vehicle, with the device thus simulating inertia based on this factor. Drag is simulated by the dynamometer applying a resistance to the rollers, governed by the actual wheel speed of the vehicle and the wind resistance factor, inertial energy may be provided by means of a fly wheel as well as simulation by other means.

Conventional roller testing stands for motor vehicles typically comprise one or more large rollers, with a single roller spanning the left and right vehicle wheels. For example, the apparatus disclosed in U.S. Pat. No. 3,554,023 (Geul); U.S. Pat. No. 5,154,076 (Wilson et al) and U.S. Pat. No. 5,193,386 (Hesse, Jr. et al), are all of this type. It is also known to provide a testing assembly for use with a motor-cycle that contacts the sole driven wheel of the vehicle (U.S. Pat. No. 5,429,004—Cruickshank).

Conventionally dynamometer resistance is provided by a braking mechanism such as an electric motor, water brake, etc. However, other resistance-generating means may be employed and the present invention is not limited to the use of any particular braking means.

A chassis dynamometer may also be operated in reverse whereby the dynamometer rollers apply a force to the vehicle wheels and rotatably drive same. In this case, the dynamometer rollers are rotatably driven by a motor or the like and the force applied by the dynamometer is measured by a force sensor. In this configuration, the dynamometer may be used to test vehicle braking, transmission, or differential system functioning. For example, a brake test may be applied, wherein the chassis dynamometer is arranged to provide a steadily increasing power output to the dynamometer rollers, with the vehicle operator applying a corresponding increasing braking force to the vehicle brakes, until either brake failure is observed, wheel lock up is achieved or a preselected maximum value is reached.

Proper vehicle maintenance requires that the vehicle powertrain and brakes apply equal forces on both sides of the vehicle. However, it is often not sufficient to know simply that an imbalance exists, without having the imbalance quantified. It is desirable for a vehicle testing arrangement which employs a chassis dynamometer, to determine quantitatively the difference in force absorbed or transmitted between right and left and wheels, for a variety of vehicle systems. Thus, in the vehicle brake test described above, it is desirable to determine whether the right and left vehicle brakes (associated with right and left vehicle wheels) are applying a different force, and the quantitative value of any such difference. Similarly, when the chassis dynamometer is used in a power absorption mode, it is desirable to determine quantitatively any force output differential between the right and left hand vehicle wheels which might be indicative of mechanical problems in the vehicle differential.

It is also desirable to provide a portable chassis dynamometer assembly, which may be easily transported to a vehicle testing site such as a vehicle depot, and quickly and easily set up for carrying out vehicle emission performance tests. This eliminates the requirement of taking each vehicle separately to a dedicated test site. For this purpose, it is desirable to provide a chassis dynamometer testing assembly composed of individual subunits which may be separately carried and easily assembled on site without having to physically or mechanically link the subunits. The solution proposed by the present inventors is to provide individual left and right-hand roller dynamometer subunits, which may be simply placed on the ground at the wheel centers of the test vehicle. Such subunits may be electronically linked via a common control subassembly.

It is known to provide systems for testing vehicles with two or more driven wheels (i.e. wheels driven by the motor) comprised of individual left and right side roller assemblies. The rollers of such assemblies either share a common axle or are connected by a rail or frame spanning the roller pairs. See for example U.S. Pat. No. 5,193,386 (Hesse, Jr. et al.) and WO97/32189 (D'Angelo). Because of the large frame required in such arrangements, they do not provide a readily portable dynamometer arrangement that would permit easy transport and set-up. The assembly of such units at a test site would be time consuming and require specialized expertise. Such arrangements thus do not satisfy the need for a simple and easily transportable testing assembly, which is also simple to assemble for on-site testing use.

A further useful feature of vehicle dynamometers is that they be capable of centering the vehicle wheel on the rollers. This may be accomplished by providing paired frusto-conical rollers that each taper inwardly towards each other for supporting two opposing drive wheels (cf. Hesse Jr., et al.). In this arrangement, the vehicle is centered between the individual left and right-hand frusto-conical rollers. However, this arrangement requires that the right and left hand roller assemblies be either linked via a rigid frame or fastened to the floor, in order to prevent sideways slippage of the roller assemblies. Alternatively, the prior art discloses separate right and left hand rollers independently moveable on a common rail, and which may be locked in position when the rollers have been centered on the vehicle wheels (D'Angelo). However, this arrangement is still unsuitable for the use contemplated in this invention, in that it requires a large, rigid rail or frame joining the left and right hand rollers, which would be unsuitable for portable use. In order to achieve the objective of a simple, readily portable assembly, it is desirable to provide a simple means for centering a vehicle on the dynamometer assembly during operation of the device. In the solution proposed by these inventors, this is provided without any extraneous centering means, and in a manner consistent with the provision of left and right and roller subunits which rest on the ground.

It is also known to provide a logic circuit which independently controls front and rear roller sets for testing various front/rear vehicle load parameters such as attitude shift. See EPO 0 522 198 A1 (Yorikatso).

It does not appear to be known from the prior art, to provide a vehicle chassis dynamometer which is able to quantitatively determine the difference in vehicle power output or braking force, between the right and left side vehicle wheels. A quantitative determination of this type may be applied to the drive wheels (in the case of vehicle power output tests) and/or non-drive wheels (in the case of measurements of vehicle braking forces).

Conventional dynamometer-based testing devices are typically large, heavy and correspondingly expensive. This results in part from the provision of a single roller for contact with left and right driven wheels of a vehicle, that is wide enough for use with substantially all conventional vehicles, resulting in a large and heavy roller arrangement. This drawback may be addressed by providing a testing apparatus formed from separate left and right hand roller dynamometer sub-assemblies for individually supporting the vehicle drive wheels, with the sub-assemblies not being mechanically linked in order to provide for easy transport and assembly. The individual dynamometer assemblies are linked only electronically through a controller. The individual dynamometers may be thus in communication with a common control unit to equalize the simulated loads between the vehicle drive wheels. This arrangement also permits for unequal loads and wheel speeds between the individual units, to simulate a vehicle driving around a curve.

SUMMARY OF THE INVENTION

An object of the present invention is to provide an improved roller dynamometer and testing method for simulating road conditions for testing a vehicle.

A further object is to provide a roller dynamometer comprising multiple dynamometer assemblies not mechanically linked to each other for common rotational movement, each dynamometer assembly for contact with an individual vehicle wheel, with the effective width of the roller dynamometer being variable by changing the distance between the individual units.

A further object is to provide a roller dynamometer that may be used with any conventional vehicle, and which has the capacity to simulate either straight-line or curved driving conditions.

A further object is to provide a relatively lightweight and portable roller dynamometer that may be conveniently transported to a testing site.

In light of the above objects, the present invention comprises in one aspect a roller dynamometer assembly for simulating road conditions for a vehicle having at least two drive wheels, of the type comprising:

first and second roller assemblies for rotatably supporting right and left hand vehicle drive wheels, each roller assembly being associated with a dynamometer having roller speed and wheel torque sensing means, characterized by:

first and second carriages for independently supporting said first and second roller assemblies, said first and second roller carriages each comprising an independent and separately transportable unit not mechanically connected to the other unit;

carriage support means for supporting at least one of said first and second carriages on a substrate independently of said other of said first and second carriages whereby said at least one carriage may be displaced on the substrate, in a direction lateral to the elongate axis of said vehicle and said substrate, while bearing said vehicle; and each carriage supporting a dynamometer, each dynamometer engaged to a corresponding roller for applying a load to said corresponding roller whereby road conditions are simulated on a vehicle engaged with said apparatus.

The carriage support means, which preferably comprise roller means such as an array of linear bearings, permit independent lateral (relative to the vehicle) movement of the carriages on a hard, level surface such as a concrete floor. This permits adjustment of the carriage spacing to accommodate different vehicles (permitting the use of relatively compact rollers) and roller self-centering on the vehicle wheels when the device is in use. The latter is particularly useful when the device simulates curved driving conditions. The left and right hand roller carriages may be independently placed on a supporting surface, and are not linked to each other by any fixed mechanical link. This provides for transport and set-up.

The rollers may also have a stepped portion at each of the opposed ends to serve as a wheel stop and fly wheel.

The apparatus further conveniently incorporates a rotary mount for supporting and mounting each dynamometer to corresponding carriages for limited rotational movement relative to said carriage.

The rotary mount preferably comprises first and second concentric members, such as a disc and trunnion bearing arrangement, engaged to said dynamometer and carriage respectively for rotation relative to each other.

In one version, the dynamometer units are in communication with a common controller, the controller receiving wheel speed and torque information from each of the dynamometer units. The controller includes processing means for comparing rotary speed differences between the first and second dynamometers and torque control means for controlling the torque applied by at least one and preferably both of the dynamometers to substantially equalize the respective rotary speeds of said rollers.

The control means preferably directs a faster spinning dynamometer to apply a greater amount of power absorption to its corresponding roller, relative to the slower spinning dynamometer.

The controller may include total power absorption calculation means, wherein the total power absorbed amongst all dynamometers is calculated as a function of the mass of the vehicle, the speed and acceleration of each roller, and a value associated with the vehicle aerodynamic and frictional losses and frictional losses within the dynamometers.

In one aspect, the controller measures and displays any difference in power output between right and left hand dynamometer assemblies. This informs the user that the power output between the left and right vehicle drive wheels may not be equal, thus indicating a potential problem with the vehicle wheels or drive train. In another aspect, the dynamometer may be operated essentially in reverse, whereby a drive means rotates the roller assemblies to drive the vehicle wheels, with the power output of the drive means being controllable by the user. Force measurement means measures and displays to the user the power output of each dynamometer, in much the same manner as power absorption is measured and displayed. The controller calculates and displays to the user in a similar manner, the power output of each dynamometer unit. The controller further calculates and displays quantitatively any difference in power output or power absorption between the right and left dynamometer units, thus indicating to the user a potential problem with the vehicle wheels, drive train or braking systems. In the above aspects relating to systems for quantifying power or force differences between left and right vehicle drive wheels, the dynamometer system comprises first and second rollers mounted on a substrate, each roller being associated with a corresponding independent power absorption/motoring unit, a speed sensor and a torque/force sensor for measuring torque forces between the PAU and the substrate.

In a further aspect, the invention comprises a method for measuring the difference in power output or power absorption as between right and left vehicle wheels, comprising the steps of:

providing a chassis dynamometer system comprised of independent right and left dynamometer units, each unit associated with its own power absorption unit and/or power supply; and a common controller linked to the first and second dynamometer units;

positioning a vehicle on the dynamometer system, whereby right and left vehicle wheels rest on respective right and left dynamometer units;

providing a force input to the right and left hand dynamometer units;

measuring any force differences detected by the right and left hand dynamometer units and quantitatively displaying such difference to the operator or storing this data for later recall.

In the above method, a force may be applied by a drive or motoring means associated with the dynamometer units, whereby each of the right and left roller units is provided with an independent drive means such as an electric motor. In this version, a force is transmitted to the vehicle wheels by the dynamometer units for absorption by the vehicle via application of a braking force or drive train resistance. Any difference in force absorbed by the vehicle as between the right and left wheels resting on the dynamometer units, is quantitatively determined and displayed to the viewer. In another aspect, the right and left vehicle wheels comprise drive wheels, and the force is applied to the dynamometer units by the vehicle. In this aspect, each dynamometer unit operates in the mode of a power absorption unit. The control means independently determines right and left side power absorption by the dynamometer units, and indicates to the user any such differential in vehicle power output between the right and left side vehicle wheels.

In one version, torque control means further permits control of one or both dynamometers to apply a controlled unequal rotary speed of the respective rollers to simulate a curved driving condition.

In another aspect, the invention comprises a roller dynamometer vehicle testing system for simulating road conditions for a vehicle, of the type comprising:

at least one roller mounted to a frame for supporting and rotatably contacting a vehicle wheel;

a dynamometer engaged to the roller for applying a load to the roller whereby road conditions are simulated on the vehicle engaged to the apparatus; characterized by:

a rotary mount for engaging and supporting dynamometer onto the frame for rotational movement relative to the frame, the rotary mount comprising first and second concentric members engaged to said dynamometer and carriage respectively.

The rotary mount is conveniently of the type characterized above. Further, the apparatus is conveniently provided with rollers for contact with the drive wheels of the test vehicle.

In a further aspect, the invention comprises a roller dynamometer for simulating road conditions for a vehicle having at least two drive wheels, of the type comprising:

first and second roller dynamometer assemblies for independent engagement with corresponding drive wheels, each roller dynamometer assembly comprising at least one roller engaged to a corresponding dynamometer, the first and second dynamometer assemblies for independent rotation of the respective rollers relative to each other and each having rotary speed and detection means and power absorption means; and characterized by:

a control unit for receiving rotary speed and torque information from said dynamometers and having a logic circuit for comparing and measuring any speed differences and controlling one and preferably both dynamometers in response to speed differences.

The logic circuit controller controls the power absorption means of the first and second dynamometers to achieve either straight-line or curved driving simulation.

The controller conveniently includes total power absorption calculation means, wherein the total power absorbed amongst all dynamometers is calculated as a function of the mass of the vehicle, the speed and acceleration of each roller, and a value associated with the vehicle aerodynamic and frictional losses and frictional losses within the dynamometer.

In a further aspect, the invention comprises a method for simulating road conditions for a vehicle of the type, comprising the steps of:

providing first and second independent roller dynamometer units each associated with torque and rotational speed sensors, the first and second units being associated with a controller for receiving speed and torque information from each dynamometer unit and independently controlling the resistance applied thereby;

supporting at least two vehicle drive wheels on corresponding first and second roller dynamometer units;

rotating the drive wheels with the test vehicle; independently measuring the speed and torque of the two drive wheels; characterized by independently controlling at least one and preferably both roller dynamometer assemblies to control the rotary speed thereof to selectively simulate the vehicle travelling in either a straight or curved path.

A further step may comprise measuring the total power output of the vehicle with an algorithm that calculates total dynamometer power absorption, wherein the total power absorbed amongst all dynamometers is calculated as a function of the mass of the vehicle, the speed and acceleration of each roller, and a value associated with the vehicle aerodynamic and frictional losses and frictional losses within the dynamometer.

The rollers preferably comprise in any of the above devices and methods a generally hourglass configuration for self-centering of the vehicle wheels.

The present invention will now be described by way of detailed description and illustration of specific examples.

BRIEF DESCRIPTION OF THE DRAWINGS

FIG. 1 is a plan view of one embodiment of the present invention;

FIG. 2 is a side elevational view of a portion of the apparatus as shown in FIG. 1;

FIG. 2a is an end elevational view of FIG. 1;

DETAILED DESCRIPTION OF THE INVENTION

Referring to FIGS. 1 and 2, the apparatus 10 includes first and second identical carriages 24, one of which is illustrated herein. In use, the respective carriages support left and right vehicle wheels when a vehicle is engaged for testing with the device. The carriages each support individual rollers, described below, for engagement with the vehicle wheels, and a separate dynamometer unit on each carriage mating with the rollers associated with that carriage. The carriages are conveniently positioned on a smooth, level, hard surface 15. Each carriage may be moved laterally (relative to the vehicle) on the surface by roller means associated with each carriage, such as a linear bearing array 30 (shown in FIG. 2) on the lower face of the carriages. The roller means further permit the carriages to roll laterally while bearing the vehicle, in order to accommodate the self-centering of the carriage rollers.

Figure 3:
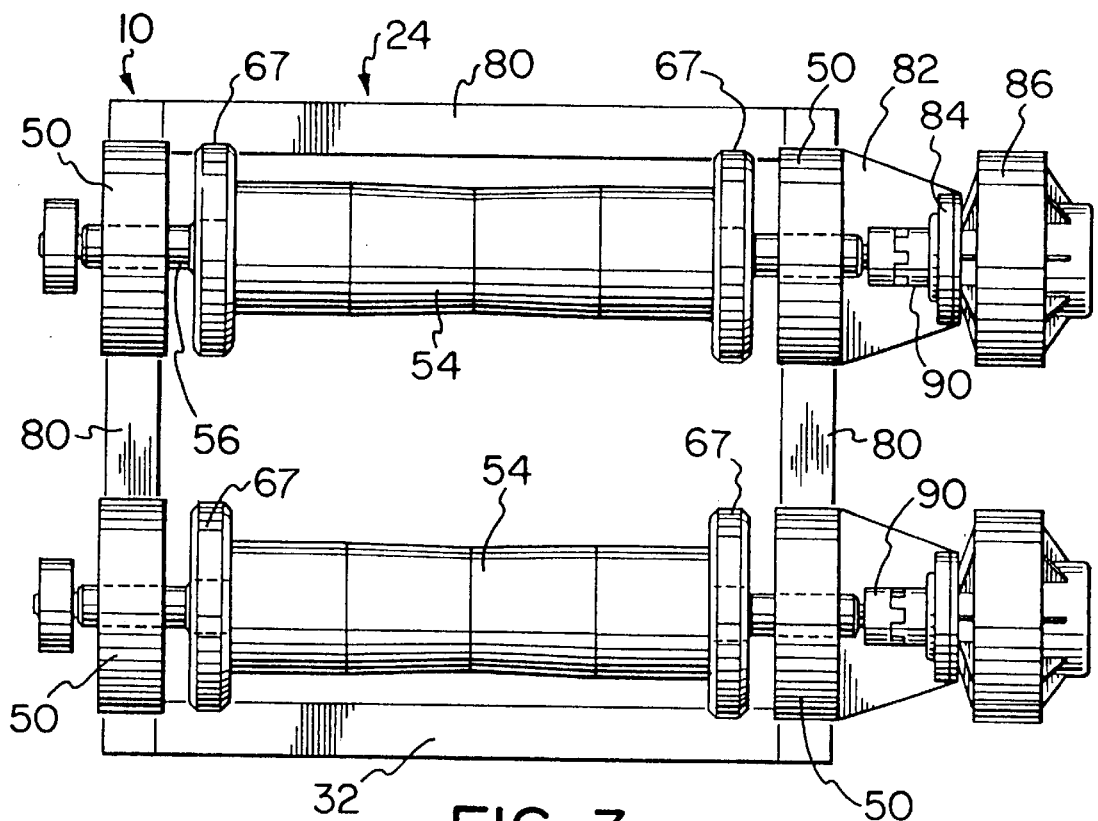
FIG. 3 is a plan view of an individual roller unit for use in accordance with the present invention.
Figure 4:
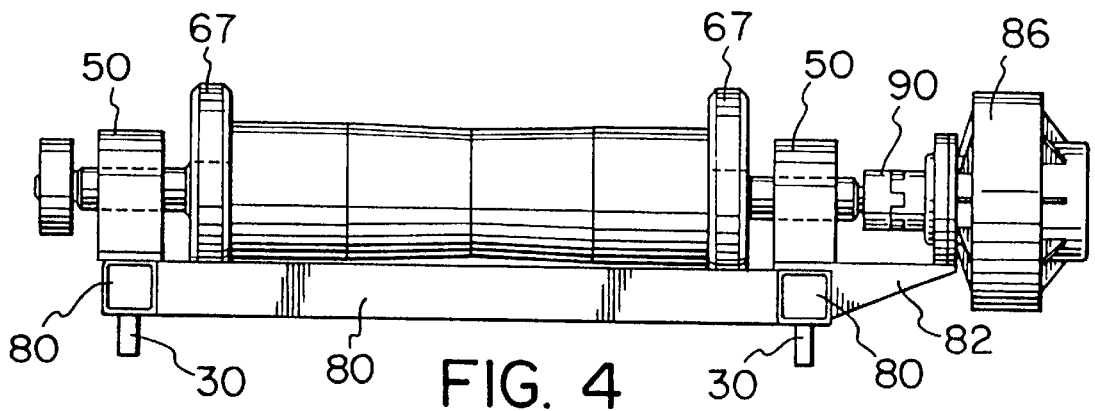
FIG. 4 is a plan view of a further embodiment of a roller carriage.
Figure 5:
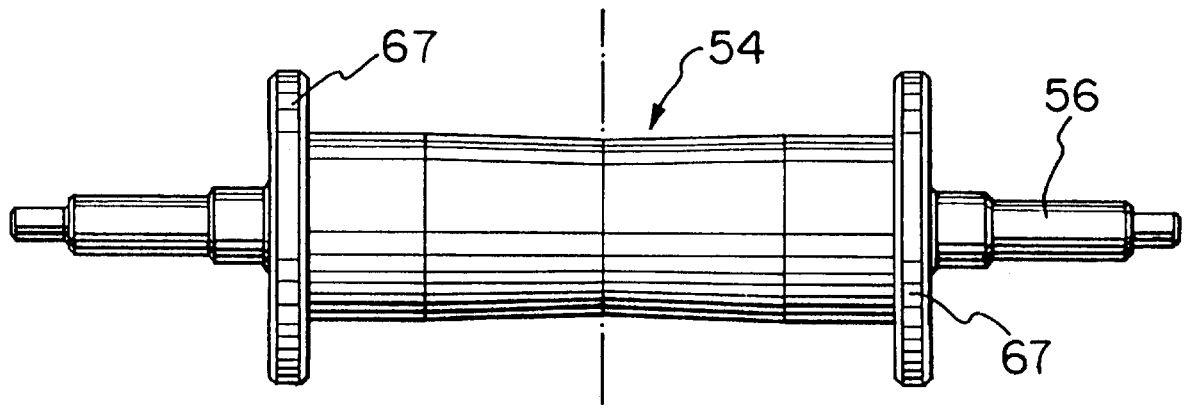
FIG. 5 is a side view of FIG. 4.

Turning to FIGS. 3–5, each carriage 24 comprises a generally rectangular carriage frame 32 composed of side frame members 34, end frame members 36, the whole being bisected by paired transverse frame members 40 and 42 to form first and second rectangular carriage portions 32a and 32b. The first carriage portion 32a supports the rollers, described below, and the second carriage portion 32b supports the dynamometer, described below. End and transverse frame members 36 and 40 of the first carriage portion 32a each support a pair of axle bushings 50 for rotatably supporting the rollers 54. Roller axles 56 associated with each of the rollers are rotatably journalled within the axle bushings. The end and transverse members 36 and 42 of the second carriage portion 32b support dynamometer mounts 60, for rotatably mounting a dynamometer 46 to the carriage. The dynamometer and mounts will be described in greater detail below.

The first carriage portion 32a supports a pair of spaced-apart rollers 54 in parallel orientation for supporting and rotationally engaging a driven wheel of a vehicle.

In one version, one of the rollers 54 of the pair is engaged to a dynamometer. The other roller freewheels. Each carriage thus supports a single dynamometer, comprising a power absorption unit ("PAU") associated with a single vehicle drive wheel. It will be seen that with modification, the rollers can be sized to accommodate paired drive wheels of the type found in trucks and busses. In another aspect, the dynamometer operates in either of a PAU mode or a drive means mode whereby the dynamometer rotatably drives the associated roller for testing, e.g., vehicle brakes.

The dynamometer mounts 60 each comprise a disc 62 fixedly mounted to the carriage portion 32b for engagement with a corresponding end face 64 of the dynamometer 46. A circular array of bearing cartridges 66 are mounted to each end face of the dynamometer, and rotatably engage the fixed disc, which includes a recessed rim 68 which comprises a bearing race.

A strain gauge holder comprises first and second arms 70, 72 extending from the dynamometer and carriage member 32b respectively. A strain gauge 74 joins the respective arms and restricts rotation of the dynamometer relative to the carriage. The strain gauge comprises a transducer for converting torque between the dynamometer and the carriage into electrical current.

In a further embodiment, shown in FIGS. 3 and 4, the carriages 24 each comprise frame members 80 forming a rectangle configuration for supporting the rollers. A dynamometer support member 82 comprising a generally plate-like member extends from a transverse frame member outwardly away from the centre of the apparatus. Each dynamometer support has an upwardly extending bushing 84 for rotatably engaging and supporting a dynamometer 86. Each roller 54 is releasably engaged in a corresponding dynamometer by means of a releasable coupling 90. A strain gauge, not shown, linking the dynamometer to the dynamometer support limits rotational movement of each dynamometer and permits accurate measurement of the rotational forces acting on the dynamometer.

Turning to the rollers 54, which are shown more particularly at FIG. 5, each of the rollers includes an upwardly stepped portion 67 at each respective end, which serves both as a fly wheel and a wheel stop to minimize the risk of a vehicle wheel disengaging from the roller.

Each roller 54 has a generally hour-glass shape, and comprises a central axis, with the body of the roller diverging from generally the mid-point of the central axis at an angle of about 170° to about 179° 59' relative to the longitudinal axis of the roller.

It is found that this arrangement facilitates accurate positioning and enhances self-centering of a wheel on the roller without undue tire wear. Lateral movement of the rollers in response to the self-centering motion is accommodated by the rollable movement of the carriage on the substrate permitted by the linear bearings.

Figure 6:
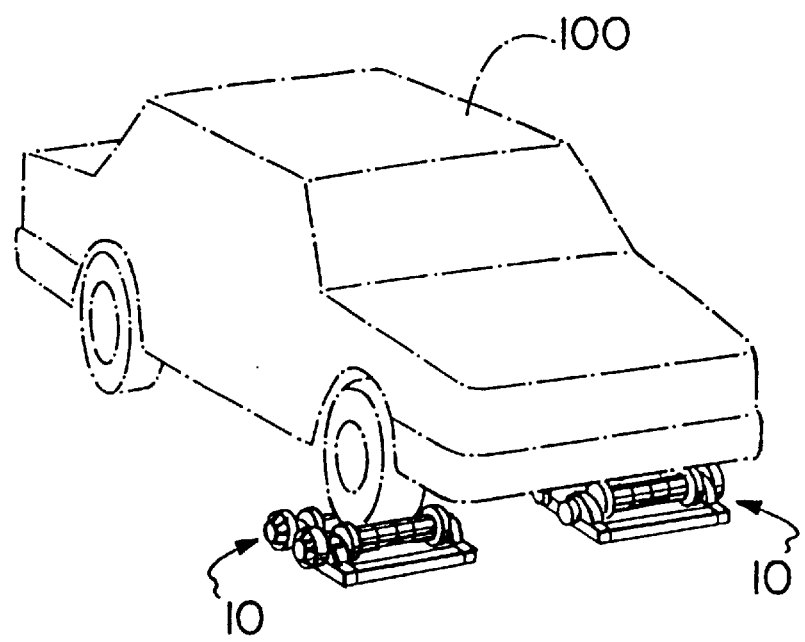
FIG. 6 is a perspective view of the apparatus in use.

FIG. 6 illustrates the disposition of the apparatus 10 under the front (drive) wheels of a vehicle 100 (shown in broken line). In the arrangement shown, the vehicle under test comprises a front-wheel drive vehicle. The apparatus may be readily adapted for use with motorcycles and other single-wheel drive vehicles, rear-wheel drive or four-wheel drive vehicles, or other drive arrangements, by means of adapting or re-positioning the units and/or providing additional units for mating with corresponding vehicle drive wheels.

Each dynamometer includes a rotational speed measurement means such as an internal optical position reader (referred to below), for measurement of the rotational position of the dynamometer shaft. The optical reader data is transmitted to the central controller described below, which calculates the rotational speed of the dynamometer and the corresponding roller.

Figure 7:
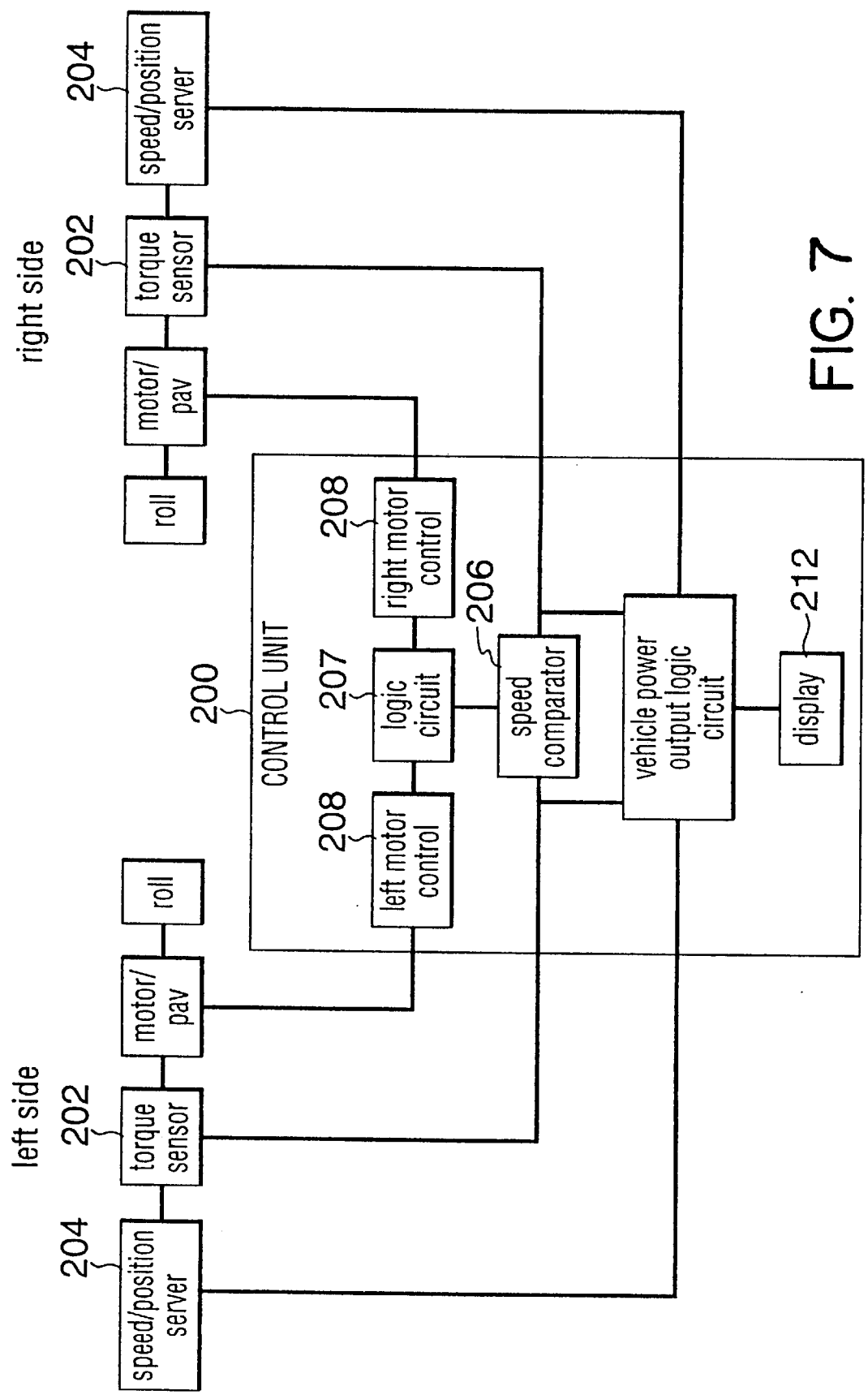
FIG. 7 is a block diagram showing the operation of the invention.

The dynamometers are each linked to a central control unit 200, which will now be described by reference to FIG. 7. The control unit permits the individual left and right dynamometers to apply a substantially exactly equal load to the corresponding wheels, to simulate straight-line driving conditions. Alternatively, a controlled unequal load may be applied to simulate the vehicle driving around a curve.

Electric signals from transducers 202 associated with strain gauges 74, indicative of the torque, may comprise amplitude or frequency variable signals. These signals, along with the signals from the optical position reader 204, are transmitted to the controller. The controller separately receives speed and torque information from each corresponding roller unit. In a straight-line driving simulation, all of the roller should spin at the same speed. Since there is no mechanical link to transmit rotation movement between the roller units corresponding to the respective vehicle sides, a logical link created by the controller to permit the controller to control the transducer to maintain identical speeds. The controller accordingly includes a comparator circuit 206 to assess any speed difference between the respective dynamometers. If any speed difference is detected, this information is transmitted to logic circuit 207, which in turn controls left and right motor control circuits 208 associated with each dynamometer, which in turn increase or decrease, as the case may be, the load applied by the respective dynamometer.

The logic circuit 207 may include software that applies a power splitting algorithm based on roll speed difference to control the respective dynamometers. The control algorithm calculates an appropriate control signal such that more of the absorbed power will be shifted to the faster spinning roll, with more load applied by the corresponding dynamometer, in order to slow it down. The dynamometer attached to the slower spinning roll will be required to absorb less power, permitting the corresponding roller to speed up. A vehicle power output logic circuit, which may be software-driven, will calculate the total power absorbed amongst all rolls, based on the following:

a) the mass of the vehicle;

b) the real time roll acceleration;

c) the roll speed and roll load to be simulated, the latter based on known vehicle aerodynamic and friction loss factors;

d) frictional losses within the dynamometer to be compensated for; and e) the force output of the vehicle.

A display 212 displays the simulated vehicle speed, turn radius and power output.

The examples given above identify an electric motor-type dynamometer; it will be seen that any suitable PAU may be used.

It will be further seen that the apparatus and method have been described by reference to a vehicle having at least two drive wheels, aspects of the invention may be readily adapted for use with a vehicle having a single drive wheel, such as a motorcycle.

Figure 8:
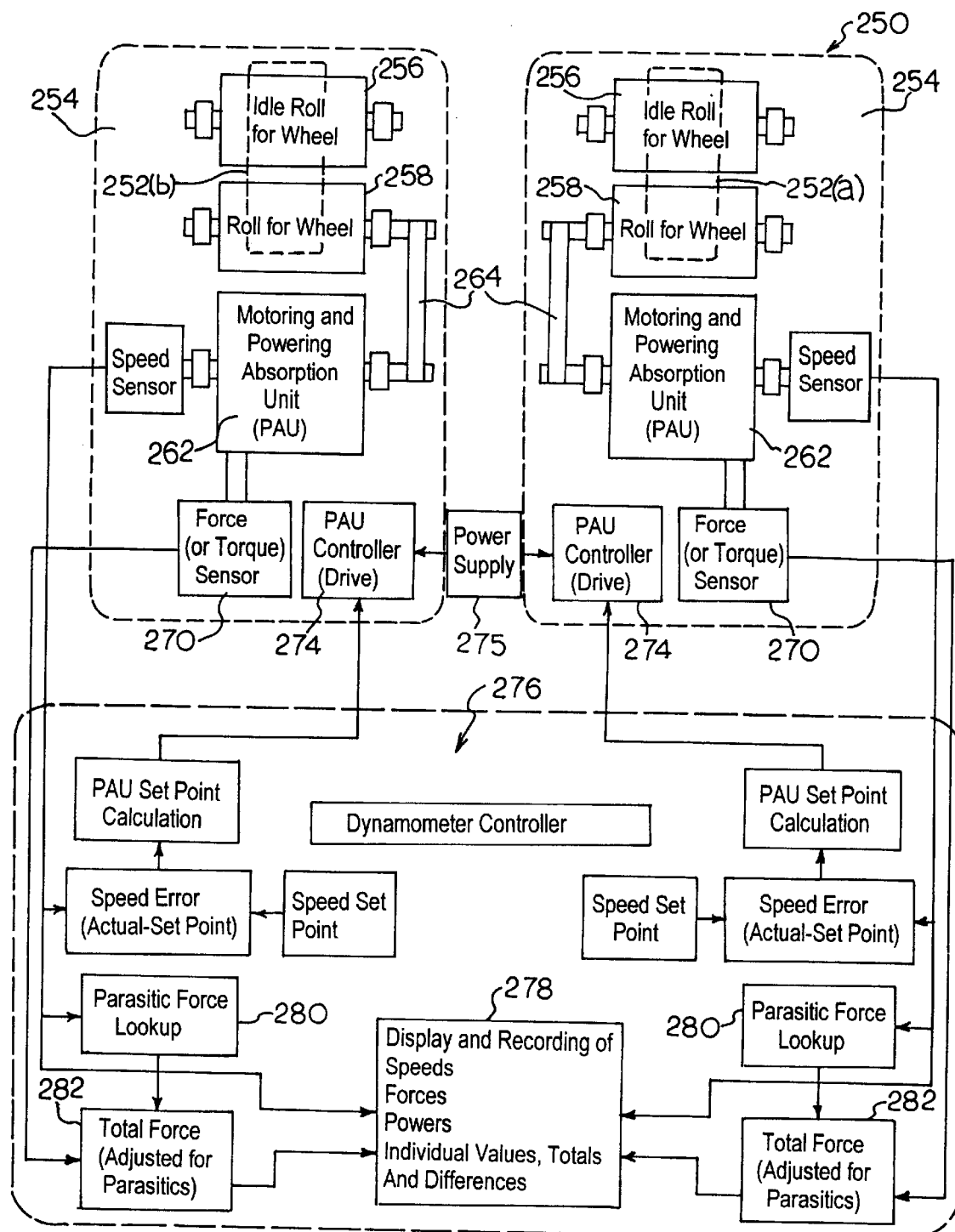
FIG. 8 is a block diagram of a second embodiment of the invention.

In a further aspect, illustrated in diagrammatic form in FIG. 8, the chassis dynamometer is arranged to measure quantitative differences between right and left vehicle wheels in terms of power output of vehicle braking force. FIG. 8 illustrates a chassis dynamometer system 250 for testing two vehicle wheels 252(*a*) and (*b*) on the right and left side of the vehicle. It will be understood that a similar arrangement may simultaneously test all four vehicle wheels, which is particularly useful for testing of four wheel drive vehicles. The system comprises right and left roller dynamometer units 254. Each dynamometer unit is composed of an idle roller 256 paired with a dynamometer roller 258, with the vehicle wheel resting on the two rollers 256 and 258. The dynamometer roller is linked to a motor and power absorption unit ("PAU") 262. The PAU 262 may be linked to the dynamometer roller 258 by way of a belt drive 264 (illustrated) or alternatively via a common shaft, as illustrated in the first embodiment. The dynamometer rollers and PAU are supported on a frame, not shown, as described in the first embodiment. Each dynamometer unit may be supported by an independent, rollable frame, as shown in the previous embodiment, or alternatively both units may be supported on a common substrate. The PAU may comprise a direct current (DC) motor, or alternatively an AC motor or other type of suitable reversible drive. The PAU 262 is mounted on the frame or substrate in such a manner that the force between the vehicle wheel and the dynamometer roller can be measured. A force sensor 270 is used to measure the amount of force that is being absorbed by the dynamometer system or alternatively, the power output from the dynamometer system. Preferably, the force sensor comprises a load cell attached at one end to a solid part of the dynamometer frame, with the other end being attached to a torque arm or lever arm attached to the PAU. The PAU is cradled mounted to the frame in the manner described above, whereby any torque experienced by the PAU is detected by the force sensor as a strain measurable between the PAU and the support frame.

The PAU motor is connected to a PAU controller 274, which preferably comprises a DC drive that converts alternating power to DC power and DC TO AC as required.

The PAU may be run either in forward or reverse drive modes. That is, it serves either as a power absorption unit for absorbing power from the vehicle wheels, or alternatively as a power source for driving the vehicle wheels with a force measurable by the force sensor.

The PAU drive controller is linked to an electrical power source 275.

The right and left PAU drive controllers 274 are each linked electronically to a common dynamometer controller 276, which includes data storage and visual display means 278. The dynamometer controller includes separate logic circuits for each the right and left dynamometer units. Each logic circuit receives information from a corresponding speed sensor 278 and force (torque) sensor 270 connected to the associated PAU. From the input from the speed sensor, the current ("real time") rotational speed of each dynamometer is determined. A vehicle speed input set by the operator, permits the operator to select a chosen speed set point for the associated dynamometer. For most testing applications, this will be the same speed for all dynamometers. The control computer calculates the difference between the said point speed value and the measured speed value of the particular dynamometer. This difference is the speed error value for the dynamometer. The error value is fed into a PAU control algorithm, which determines what the command setting for the given PAU controller should be, to permit the speed error to be reduced for that particular dynamometer. This PAU command setting is then fed to the PAU controller that supplies the appropriate power to the PAU or absorbs the appropriate power from the PAU in order to minimize the speed error. This feedback arrangement is performed simultaneously for all of the dynamometer units in the system.

Further accuracy is achieved by measuring and recording the forces that are required to overcome "parasitic losses" in the system. These are losses caused by friction, windage and other losses that must be accounted for such that an accurate force value can be calculated. The dynamometer speed sensor feeds data to the parasitic force lookup component 280 of the dynamometer controller. The parasitic force lookup in turn adds onto the speed value, a value associated with the parasitic forces, and feeds the combined information to a total force sensor 282. The total force sensor is fed data from the force (torque) sensor 270 connected to the PAU, to calculate a value for the corrected total force for the associated vehicle wheel. From the speed and corrected force of each dynamometer, the power that is absorbed at the roll to wheel interface by the dynamometer or output from the dynamometer onto the roll to wheel interfaces is calculated for each vehicle wheel. These values and the differences between them along with the total force and total power can be displayed for the operator and/or recorded for later retrieval. Since a separate logic circuit is linked to each of the dynamometer units, the difference in power or the difference in force values between the dynamometer units, reflective of imbalances in the vehicle systems between left and right vehicle wheels, can be detected. This permits drive train problems, wheel problems, brake problems or other vehicle problems to be detected.

When the PAU is absorbing power from the vehicle, the total power output of the vehicle can be measured. This permits testing of the vehicle horsepower output at different vehicle speeds. When the PAU drives the vehicle (for example during a brake test) the power that is required to rotate the vehicle wheels and the drive train is measured. If during either operation in the power absorption or power supply modes there is detected a difference in vehicle wheel force between the right and left dynamometer units, it may indicate a problem with the vehicle wheels, drive train or braking system.

With the above arrangement, the control system may be set up to permit the dynamometer units to rotate at different speeds. This can be used to test the effects of wheels turning on a vehicle at different speeds, simulating traveling around corners. The effects on the drive train components such as the vehicle differential can be thus monitored.

The dynamometer system can also simulate wheel slippage and skidding. This can be used to test traction control systems and anti-lock and anti-skid braking systems. By having the wheels turn at different speeds the response of these vehicle safety control systems can be monitored and checked to ensure that they are functioning correctly.

In one aspect, an arrangement as illustrated in FIG. 8 is provided with four dynamometer units for testing all wheel drive vehicles without damage to the vehicle drive trains. Due to the independent nature of the dynamometer units in this system, which are not mechanically linked but only linked by way of logic circuits, the dynamometer control computer has complete control over how each dynamometer in the system interacts with the vehicle wheels. This minimizes or prevents damage to all wheel drive vehicle systems, when, for example, anti-lock braking systems are being measured in which there is otherwise a potential for damage to the drive train differential.

In a further aspect, the invention comprises a method for testing vehicle drive train or brake system performance, and in particular for quantitatively measuring force differences between right and left vehicle wheels. A chassis dynamometer of the types described above is provides. Right and left vehicle wheels, on either the front, rear or all four wheels of the vehicle, are supported on independent chassis dynamometers. The independent dynamometers are linked to each other by way of the logic means characterized above, and are not mechanically linked in such a way that rotary force from the individual dynamometer units is transmitted to any other unit. In one aspect, vehicle braking forces are tested. In this aspect, the dynamometer rollers are rotatably driven by the PAU, which when in operation in this mode comprises a motor. For each vehicle wheel, the rotary speed and torque are measured. A common speed set point is input by the operator, and each dynamometer unit achieves the selected speed via the feedback means described above. The braking force of each vehicle wheel is measured, and corrected for the parasitic forces described above. The difference between the right and left hand wheel forces is measured and both displayed to the operator and stored for later retrieval.

In another aspect, the above method is adapted for measuring force differences between right and left hand vehicle wheels, in which the vehicle provides the drive and the dynamometer absorbs power from the vehicle. In this method, force differentials and power output between the right and left vehicle wheels is quantitatively determined and displayed to the operator and stored for later retrieval.

Although the present invention has been described by way of preferred version, it will be seen that numerous departures and variations may be made to the invention without departing from the spirit and scope of the invention as defined in the claims.

We claim:

1. A vehicle chassis dynamometer system, for selectively testing vehicle wheel power output and braking, on a vehicle having at least two drive wheels, comprising:

first and second dynamometer units for communication with said two drive wheels, each unit comprising a roller for contact with a vehicle drive wheel, a motoring and power absorption unit in communication with said roller, said roller and motoring and power absorption unit mounted on a substrate;

a speed sensor for measuring rotary speed of each roller;

a torque sensor associated with each motoring and power absorption unit for detecting torque between said power absorption unit and said substrate;

a dynamometer controller linked to each dynamometer unit, said controller having a separate logic circuit associated with each dynamometer unit, each said logic circuit comprising roller speed feedback means for controlling rotary speed of each said roller independently the other of said rollers, whereby the rotary speed thereof may be set at a selected set point; total force calculation means for determining total vehicle braking or drive force applied to each dynamometer unit; and differential wheel power calculations means for quantitatively measuring, calculating, visually displaying and/or storing for subsequence recall, the difference between braking or vehicle drive power of right and left vehicle wheels.

2. A system as defined in claim 1, wherein said dynamometer controller measures absolute vehicle braking force for each of said right and left vehicle wheels, as well as any quantitative difference in braking force between said right and left vehicle wheels.

3. The system as defined in claim 1, wherein said dynamometer controller measures total vehicle wheel power output for each of said right and left vehicle wheels, as well as quantitative power output difference between said right and left vehicle wheels.

4. The system as defined in claim 1, wherein four roller dynamometer units are provided for testing vehicle power output and/or braking forces on a four wheel drive vehicle, each of said four dynamometer units being associated with an independent logic circuit within said dynamometer controller for independent speed and force control and measurement.

5. A method for testing vehicle power output or braking force, in a vehicle having at least two drive wheels, comprising in steps of:

providing a testing system as defined in claim 1;

positioning at least two vehicle drive wheels on corresponding right and left dynamometer units;

applying a force to each said right and left hand dynamometer units with said vehicle wheels;

measuring said force with said right and left hand units and measuring the difference in force between said units;

displaying said difference in force and/or storing information for subsequent retrieval.

6. A method as defined in claim 5, wherein said motoring and power absorption units operate in a power absorption mode whereby the motoring and power absorption units are driven by said vehicle wheels, and said dynamometer controller measures force output of said vehicle wheels and the difference between the force output of said right and left hand ventricle wheels.

7. A method as defined in claim 5, wherein said motoring and power absorption units operate in a motoring mode whereby the motoring and power absorption units drive said vehicle wheels and said vehicle applies a braking force to said vehicle wheels, with said braking force applied by each vehicle wheel and the difference in braking force between said vehicle wheels, being calculated by said controller.

* * * * *

UNITED STATES PATENT AND TRADEMARK OFFICE
CERTIFICATE OF CORRECTION

PATENT NO. : 6,257,054 B1
DATED : July 10, 2001
INVENTOR(S) : Jacek L. Rostkowski, Dsemond McGonegal, Frederick J. Hendren Page 1 of 1

It is certified that error appears in the above-identified patent and that said Letters Patent is hereby corrected as shown below:

Title page,
Item [21], should read -- Her Majesty the Queen in Right of Canada, as represented by the Minister of the Environment --.
The Assignee, should not read "Her Majesty the Queen in Right of Canada, as represented by the Minister of Natural Resources".

Signed and Sealed this

Second Day of April, 2002

Attest:

Attesting Officer

JAMES E. ROGAN
*Director of the United States Patent and Trademark Office*